United States Patent
Cromer et al.

(10) Patent No.: US 6,263,441 B1
(45) Date of Patent: Jul. 17, 2001

(54) REAL-TIME ALERT MECHANISM FOR SIGNALING CHANGE OF SYSTEM CONFIGURATION

(75) Inventors: Daryl C. Cromer, Cary; Brandon J. Ellison, Raleigh; Robert Joseph Evans, Cary; Eric Richard Kern, Durham; James Peter Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/167,202

(22) Filed: Oct. 6, 1998

(51) Int. Cl.[7] ................................................. G06F 11/30
(52) U.S. Cl. ............................................. 713/200; 710/104
(58) Field of Search .................................. 713/200–201, 713/194; 710/8, 15, 17, 101, 102, 103, 104

(56) References Cited

U.S. PATENT DOCUMENTS

| | | | |
|---|---|---|---|
| 5,406,260 | * | 4/1995 | Cummings et al. .................. 340/568 |
| 5,568,611 | * | 10/1996 | Khatri et al. .......................... 713/200 |
| 5,644,731 | * | 7/1997 | Liencres et al. ...................... 395/283 |
| 5,748,083 | * | 5/1998 | Rietkerk ............................... 340/568 |
| 5,912,621 | * | 6/1999 | Schmidt ................................ 340/571 |
| 5,945,915 | * | 8/1999 | Cromer et al. ..................... 340/686.1 |
| 6,014,746 | * | 1/2000 | Krehnke et al. ...................... 713/200 |
| 6,014,747 | * | 1/2000 | Fackenthall et al. ................. 713/200 |
| 6,056,579 | * | 5/2000 | Richards, III et al. ............... 439/358 |
| 6,064,305 | * | 5/2000 | Lockyer ............................. 340/568.2 |
| 6,111,505 | * | 8/2000 | Wagener ............................ 340/568.1 |

FOREIGN PATENT DOCUMENTS

WO 97/09667 * 3/1997 (WO) ................................ G06F/1/00

OTHER PUBLICATIONS

Microsoft Press, "Computer Dictionary, 2nd edition", p. 182, 1994.*

* cited by examiner

*Primary Examiner*—Robert Beausoleil
*Assistant Examiner*—Scott Baderman
(74) *Attorney, Agent, or Firm*—John B. Schelkopf; Andrew Dillon

(57) ABSTRACT

A method of monitoring a networked computer system by detecting a change to a configuration of the computer system, using detection logic of the computer, and generating an alert associated with any change in the configuration in real time. The alert is transmitted to a remote server on the network. In an illustrative implementation, the detection logic can detect (i) a change in the number of storage devices present in the computer system, (ii) a change in the number of memory modules present in the computer system, and (iii) a change in the number of processors present in the computer system. The configuration information may be saved between boot operations of the computer using a battery-powered latch.

16 Claims, 4 Drawing Sheets

REAL-TIME ALERT MECHANISM FOR SIGNALING CHANGE OF SYSTEM CONFIGURATION

BACKGROUND OF THE INVENTION

1. Field of the Invention

The present invention generally relates to computer systems, and more particularly to an inexpensive mechanism for real-time monitoring of computer components in network clients (workstations), and generating alerts to a remote network server signaling a component loss or change of system configuration.

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values that are fed to or generated by the programs. A processing unit communicates with the other components by various means, including one or more interconnects (buses), or direct memory-access channels. A computer system may have many additional components, such as serial and parallel ports and expansion slots for connection to, e.g., printers and network adapters. Other components might further be used in conjunction with the foregoing; for example, a display adapter might be used to control a video display monitor, a memory controller can be used to access the system memory, etc.

Computers can be interconnected in a variety of ways, one common approach being a client-server network. A generalized client-server computing network 2 is shown in FIG. 1. Network 2 has several nodes or servers 4, 6, 8 and 10 which are interconnected, either directly to each other or indirectly through one of the other servers. Each server is essentially a stand-alone computer system as described above (having one or more processors, memory devices, storage devices and communications devices), but has been adapted (programmed) for one primary purpose, that of providing information to individual users at another set of nodes, or workstation clients 12. Clients 12 can also be fully functional, stand-alone computer systems (like computers, or PCs), or so-called "dumber" systems adapted for limited use with network 2 (like network computers, or NCs). A single, physical computer can act as both a server and a client, although this implementation occurs infrequently.

A client is generally a member of a class or group of computers or computer systems that uses the services of another class or group to which it is not related. A client also be thought of as a process (i.e., a program or task) that requests a service which is provided by another program. The client process uses the requested service without having to "know" any working details about the other program or the service itself. Based upon requests by the user, a server presents filtered electronic information to the user as server responses to the client process.

The information provided by a server can be in the form of programs which run locally on a given client 12, or in the form of data such as files that are used by other programs. Users can also communicate with each other in real-time as well as by delayed file delivery, i.e., users connected to the same server can all communicate with each other without the need for the complete network 2, and users at different servers, such as servers 4 and 6, can communicate with each other via network 2. The network can be local in nature, or can be further connected to other systems (not shown) as indicated with servers 8 and 10. The construction of network 2 is also generally applicable to the Internet.

As described above, a given computer can have many components that are generally removable, and so a large network has a tremendous amount of such relocatable assets. Theft of personal computer components, particularly those located at unsecured workstation clients, is thus becoming a major industry problem. Costly components such as central processing units (CPUs), memory, hard disks and disk drives are easily removed. Frequently, the components are reinstalled in another machine within a company. In given the small size of many of the components, they can be hidden in a pocket, briefcase or purse, and away for use in a home system.

Several solutions have been provided to address the issue of component theft. Some computer desktop systems such as those sold by International Business Machines Corp. (IBM—assignee of the present invention) have a tamper detect circuit, which requires the user to enter a password to boot the system after the cover of the desktop unit has been removed. Another solution is IBM's "Alert on LAN," which creates a network alert whenever a desktop unit's cover is removed. Neither of these solutions, however, provides information about removal or addition of critical components inside the computer system.

In light of the foregoing, it would be desirable to provide a method of notifying a remote server when key system components are removed or added to a networked computer. It would be further advantageous if the method did not require additional cabling or hardware, and if it could operate with standard network protocols and with standard management applications.

SUMMARY OF THE INVENTION

It is therefore one object of the present invention to provide an improved method and system for monitoring computer components.

It is another object of the present invention to provide such a method and system that can generate alerts to a remote network server in the event of a change in a computer's configuration.

It is yet another object of the present invention to provide such a method and system that is generally compatible with conventional hardware and protocols.

The foregoing objects are achieved in a method of monitoring a computer system, generally comprising the steps of detecting a change to a configuration of the computer system, using detection logic of the computer, and generating an alert associated with any change in the configuration in real time. The computer system is networked, and the alert is transmitted to a remote server. In an illustrative implementation, the detection logic can detect (i) a change in the number of storage devices present in the computer system, (ii) a change in the number of memory modules present in the computer system, and (iii) a change in the number of processors present in the computer system. The configuration information may be saved between boot operations of the computer using a battery-powered latch. By detecting any change with sensitive components on networked clients, the present invention provides effective asset control over relocatable computer components.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
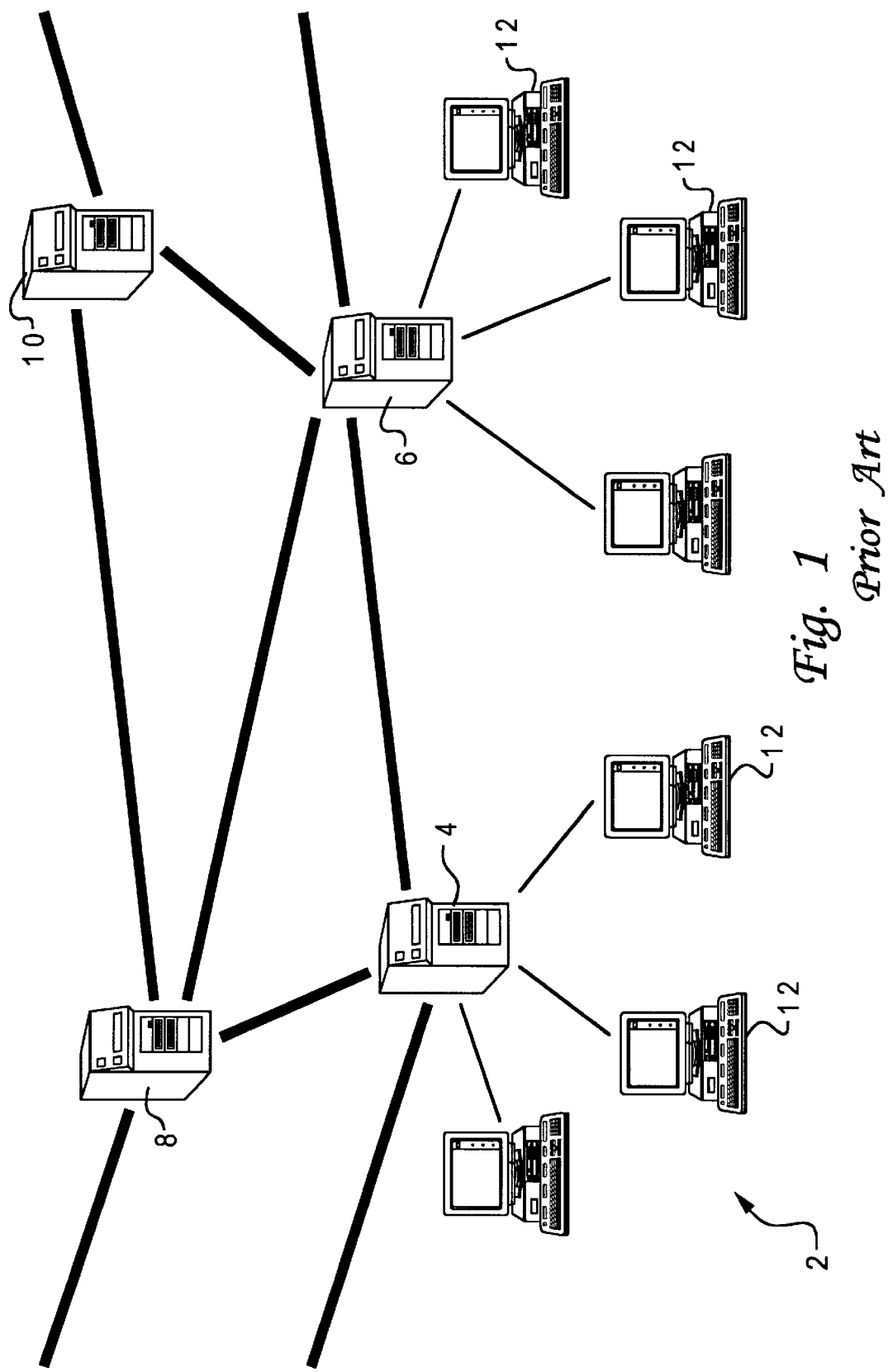
FIG. 1 is a diagram of a conventional computer network, including interconnected servers and workstation clients.
Figure 2:
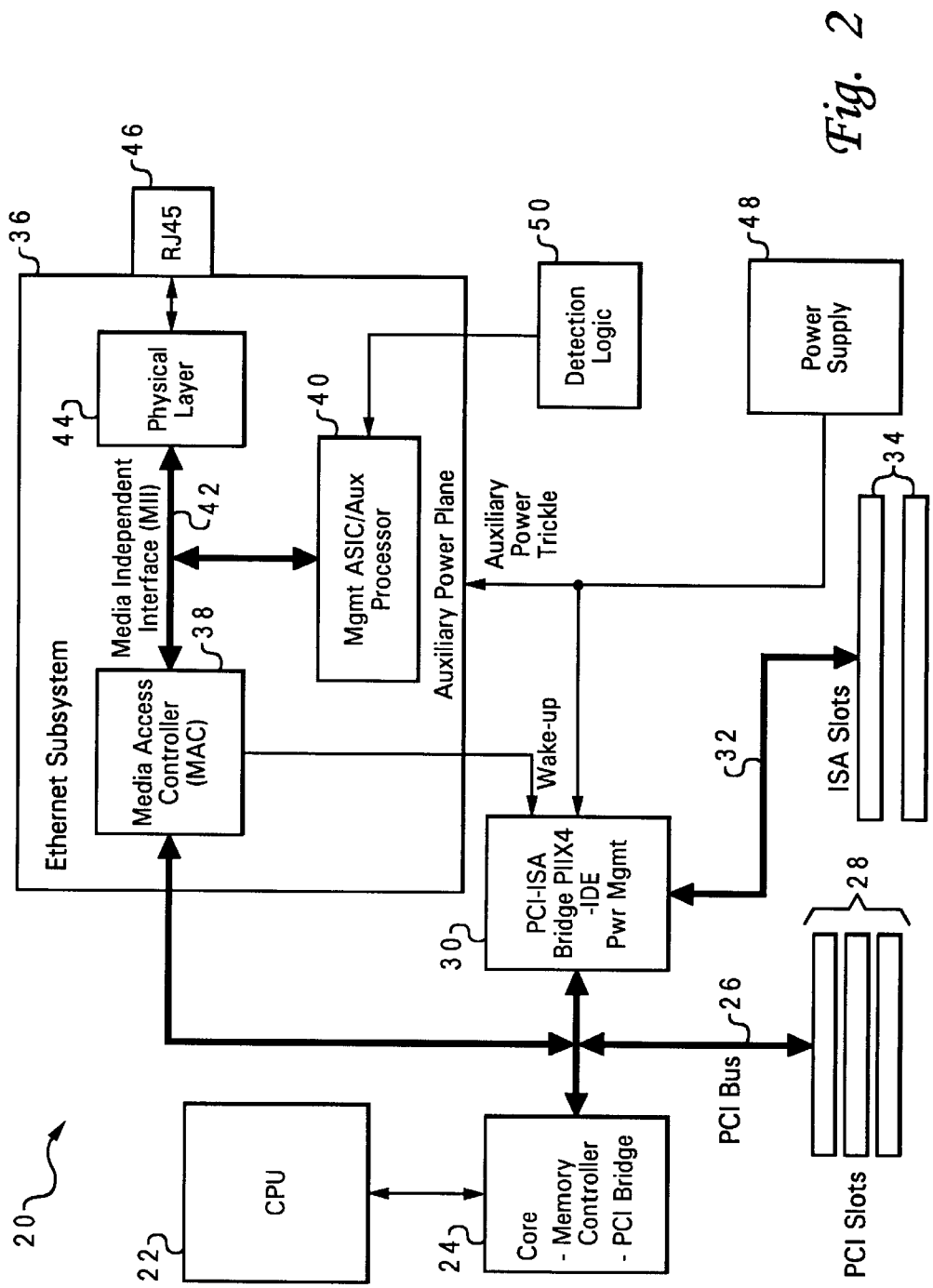
FIG. 2 is a block diagram of one embodiment of a computer system constructed in accordance with the present invention to provide component monitoring and alert generation upon a change in system configuration.

With reference now to the figures, and in particular with reference to FIG. 2, there is depicted one embodiment 20 of a computer system constructed in accordance with the present invention. Those skilled in the art will appreciate that the computer system's hardware may include additional components not shown in FIG. 2, or have a different interconnection architecture for the illustrated components so, while the present invention may be understood with reference to FIG. 2, this reference should not be construed in a limiting sense.

The present invention provides computer system 20 with a combination of monitoring circuits and alert generation, to allow notification to a remote server whenever key system components are removed or added to the system. The alerts inform network administrators or security personnel that a configuration change in critical components has occurred to a computer system, in real time. The administrator or security personnel can investigate any unauthorized removal or addition of components to machines.

The described implementation is directed to a client server network, but the invention may be implemented with other network architectures (e.g., peer-to-peer) so, again, this reference should not be construed in a limiting sense. The invention may in particular be provided as an extension to IBM's Alert on LAN. The following description is based on an on-board Ethernet solution, however the concept can be applied to other communications media such as Token Ring, asynchronous transfer mode (ATM), or modem.

The illustrative embodiment exploits the management ASIC (application-specific integrated circuit) or service processor currently supported in IBM's PC3000PL family of products. The management ASIC may be designed to interface to a media independent interface (MII), or have a direct connection to a media access controller (MAC) via a sideband bus. This approach allows the management ASIC to co-exist with the system's MAC and does not require additional cabling and hardware. The management ASIC runs with standard network protocols and with standard management applications such as Intel's LANDesK and IBM's NETFINITY.

The connections between the ASIC/auxiliary processor and the other system components are shown in FIG. 2. A central processing unit (CPU) 22 is connected to a core 24 which includes a memory controller and a peripheral component interconnect (PCI) bridge. The PCI bridge provides an interconnection with a PCI bus 26 that supports several PCI slots 28. An industry standard architecture (ISA) bridge 30 is connected to PCI bus 26, and provides an interconnection with an ISA bus 32 that supports several ISA slots 34.

An Ethernet subsystem 36 is also connected to PCI bus 26. Ethernet subsystem 36 includes a MAC 38, an auxiliary processor (ASIC) 40 connected to MAC 38 via the MII bus 42, and to the physical layer 44 which is provided with an RJ45 connector 46. The system's power supply 48 provides an auxiliary power plane to Ethernet subsystem 36, and an auxiliary power trickle to the power management feature of ISA bridge 30.

Detection logic 50 provides an input to management ASIC 40. Detection logic 50 is designed to monitor when a change to the configuration of system 20 occurs. Illustrative mechanisms for monitoring CPU, memory, and direct access storage device (DASD) are described below.

Figure 3:
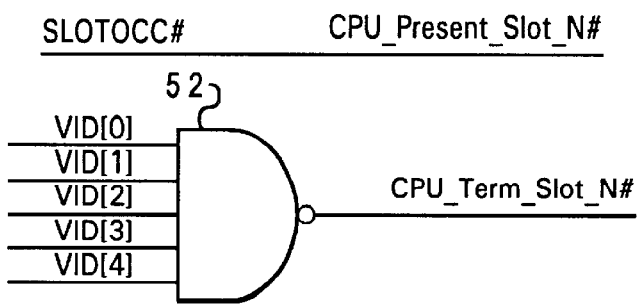
FIG. 3 is a schematic diagram illustrating a circuit used in accordance with the present invention to detect a change in the number of processors present in the computer system.

As illustrated in FIG. 3, the CPU presence monitoring may be detected by snooping the SLOTOCC# pin (B101) that is provided on the Pentium II module. This pin is an open-drain to ground that is pulled high on the planar. When a processor is present, the line is pulled low, so a low signal on this line indicates the slot is occupied.

A potential problem in dual-processor machines is that a terminator card, which is required if a second processor is not installed, will also put this line low. An optional feature of the invention is a method to differentiate between processor and terminator card. The Pentium II provides five pins that indicate the voltage needed by the processor. A terminator card drives all five pins high, whereas a Pentium II drives the pins to a different state that indicates a voltage level. Using appropriate logic gates 52, it can be determined if the occupied slot contains a terminator or a processor. This configuration can be used for each processor slot in a machine (N=1 to x). Management ASIC 40 monitors the CPU_present_Slot_N# line and the CPU_Term_Slot_N# line for each processor. If a change occurs, a network alert is generated detailing the change.

Figure 4:
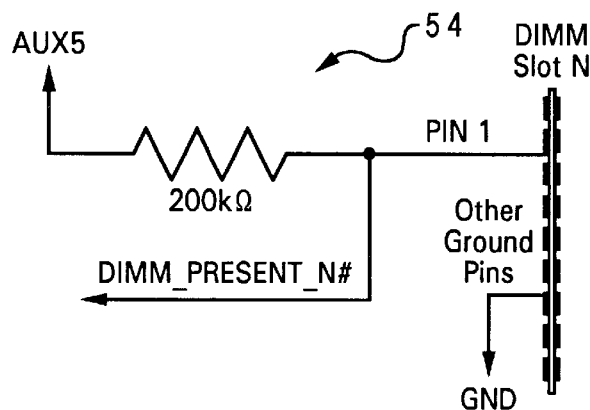
FIG. 4 is a schematic diagram illustrating a circuit used in accordance with the present invention to detect a change in the number of memory modules present in the computer system.

Management ASIC 40 also tracks which sockets contain dual in-line memory modules (DIMMs), and detects any change to either insertion or removal of DIMMs. Two implementations are presented here. The first implementation does not require a change to the DIMM. A standard DIMM has 18 ground pins (pins 1, 12, 23, 32, 43, 54, 64, 68, 78, 85, 96, 107, 116, 127, 138, 148, 152 and 162). A DIMM's presence can be detected as shown in FIG. 4, by sacrificing a ground pin and placing ground-sense logic 54 in its place.

The second implementation requires a change to the JEDEC standard (Joint Electron Device Engineering Council). There are currently around ten "No Connects" (NCs) on a DIMM. By changing one of the NCs into an open-drain to ground, a DIMMs presence can be detected in the same manner as the processor SLOTOCC# signal described above. This pin then becomes the DIMM_PRESENT_0# signal and a similar latch configuration can be used as shown in FIG. 3. This configuration can be used for each memory slot in the machine (N=1 to x). The management ASIC monitors the DIMM_present_Slot_N# for each DIMM. If a change occurs, a network alert is generated detailing the change.

Figure 5:
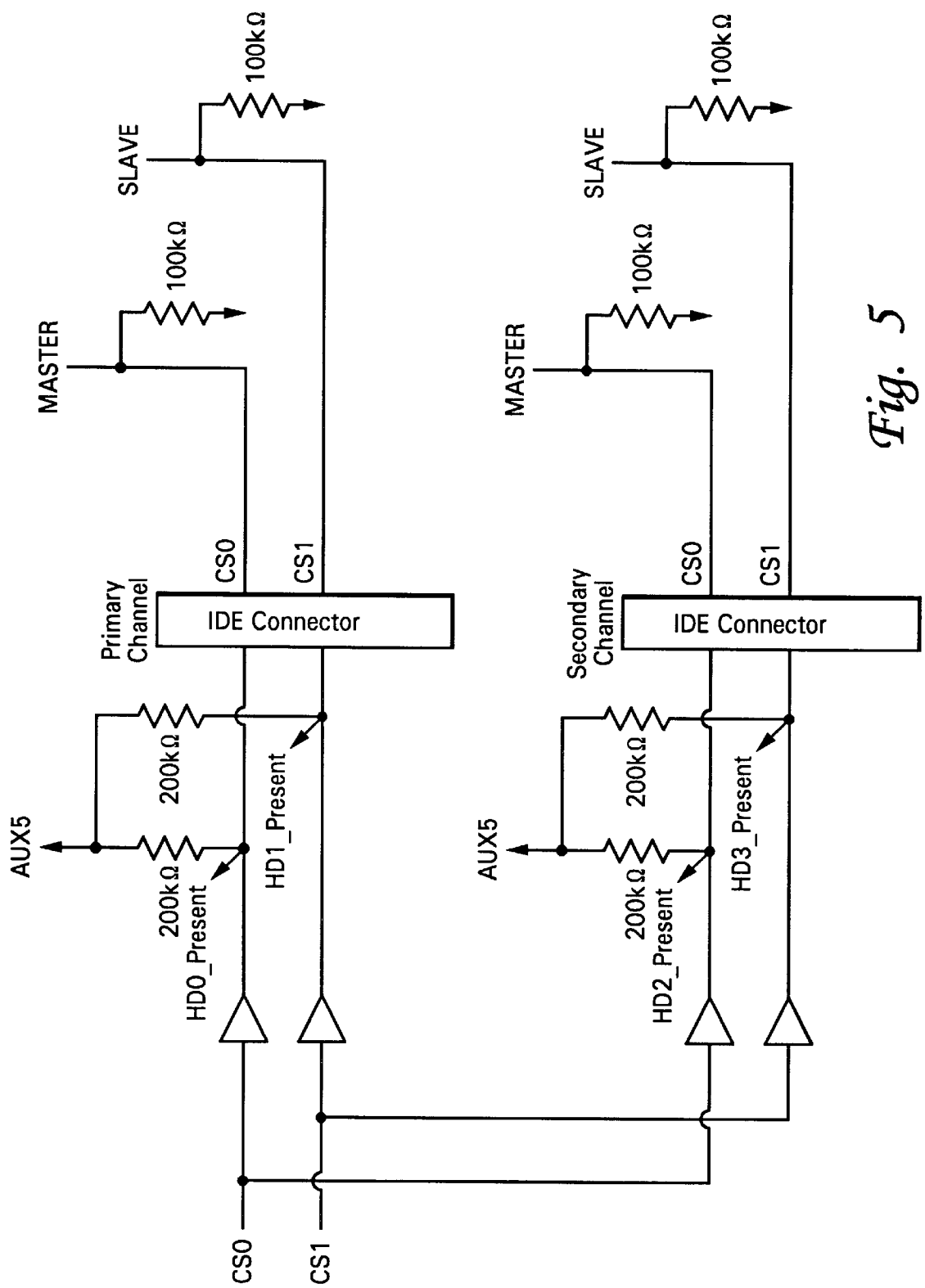
FIG. 5 is a schematic diagram illustrating a circuit used in accordance with the present invention to detect a change in the number of direct access storage devices (hard disks) present in the computer system.

DASD monitoring differs from the above methods because the pins used by the primary channel of an IDE controller are shared with the secondary channel. Also, the pins are shared between two devices (drives) on the same channel. The CS0 and CS1 pins select between the two drives (master and slave) on the channel. The channel is selected by the data strobe lines, DIOR and DIOW. Different IDE controllers use different configurations; the diagram shown in FIG. 5 is a presence detection implementation for use on a controller that shares the CS0 and CS1 lines. The presence detect logic is only valid when the drives are not in use, which is taken into account by detection logic 50. During use, the presence detect logic will not interfere with normal operation.

Figure 6:
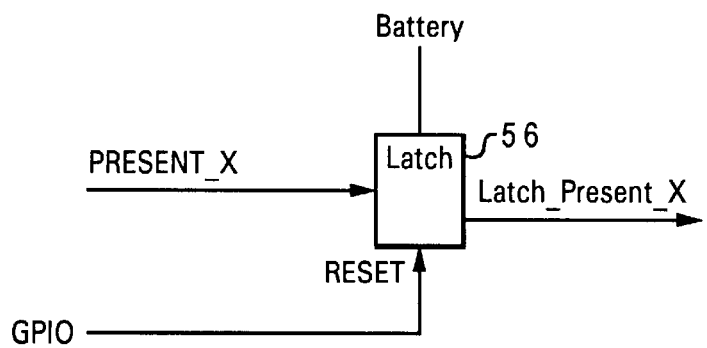
FIG. 6 is a schematic diagram illustrating a latch used in accordance with the present invention to retain information regarding the configuration of the computer system.

To expand device configuration checking beyond boot time (off and sleep states), management ASIC 40 emulates in hardware the functions of setup and CMOS. Management ASIC keeps track of the previous state of the system's configuration to determine if a change has occurred. As shown in FIG. 6, a battery-powered latch 56 is used either in management ASIC 40 or on the planar (motherboard) to latch the previous state. The previous state is compared to the current state and a change results in a network alert. When the power-on self-test (POST) completes setup, it resets the latch to capture the new/current configuration.

The present invention provides several unique benefits. By detecting any tampering with sensitive components on networked clients, it provides effective asset control in a manner heretofore unheard of. Notification of changes in to a remote server occurs in real-time. As an added advantage, the invention allows the detection, during the manufacturing process, of which components are installed in a machine without requiring removal of the machine from the box.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, those skilled in the art will appreciate that the present invention can be extended to monitor other components not described above, such as a modem that is connected to the computer system. It is therefore contemplated that such modifications can be made without departing from the spirit or scope of the present invention as defined in the appended claims.

What is claimed is:

1. A method of monitoring a computer system, comprising:
    detecting a change to a configuration of the computer system, using detection logic, wherein, when said change in the configuration includes a change in the number of processors present in the computer system, said detection logic completes said detecting by differentiating whether a terminator card is present in a processor slot; and
    generating an alert associated with the change in the configuration.

2. The method of claim 1, wherein the computer system is networked, and further comprises the step of transmitting the alert to a remote server.

3. The method of claim 1, wherein said detecting step occurs during real time operation of the computer system.

4. The method of claim 1, further comprising storing the configuration in a latch prior to said detecting step.

5. The method of claim 1, wherein said detecting step includes detecting a change in the number of storage devices present in the computer system.

6. The method of claim 1, wherein said detecting step includes detecting a change in the number of memory modules present in the computer system.

7. A computer system comprising:
    one or more processors;
    one or more storage devices connected to said one or more processors;
    one or more memory modules connected to said one or more processors; and
    means for generating an alert in response to a change to a configuration of the computer system, wherein, when said change in the configuration includes a change in the number of processors present in the computer system, said generating is completed in response to a detection logic differentiating whether a terminator card is present in a processor slot.

8. The computer system of claim 7, wherein the computer system is networked, and further comprises means for transmitting said alert to a remote server.

9. The computer system of claim 7, wherein said generating means includes means for storing the configuration in a latch.

10. The computer system of claim 7, wherein said generating means includes means for detecting a change in the number of said storage devices present in the computer system.

11. The computer system of claim 10, further comprising a controller for said storage devices, wherein said detecting means includes presence detect logic which taps off pins used to select a particular storage device on a channel of said controller.

12. The computer system of claim 7, wherein said generating means includes means for detecting a change in the number of said memory modules present in the computer system.

13. The computer system of claim 12, wherein said detecting means includes ground-sense logic attached to a ground pin of each memory module.

14. The computer system of claim 7, wherein said generating means includes an auxiliary processor.

15. The computer system of claim 14, wherein said auxiliary processor is an application-specific integrated circuit.

16. A computer network comprising:
    at least one server; and
    at least one client connected to said server, said client having:
        a plurality of processors;
        a plurality of storage devices connected to said processors;
        a plurality of memory modules connected to said processors,
        first means for generating an alert in response to a change to a configuration of the client; and
        second means for transmitting said alert to said server, wherein said generating means includes means for detecting a change in (i) the number of said processors present in the client by differentiating whether a terminator card is present in a processor slot, (ii) the number of said storage devices present in the client, and (iii) the number of said memory modules present in the client.

* * * * *